United States Patent
Cremers et al.

(10) Patent No.: US 9,843,738 B2
(45) Date of Patent: Dec. 12, 2017

(54) HIGH DYNAMIC RANGE IMAGING PIXELS WITH IMPROVED READOUT

(71) Applicant: SEMICONDUCTOR COMPONENTS INDUSTRIES, LLC, Phoenix, AZ (US)

(72) Inventors: Bart Cremers, Zonhoven (BE); Manuel H. Innocent, Wezemaal (BE)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/145,643

(22) Filed: May 3, 2016

(65) Prior Publication Data

US 2017/0099423 A1    Apr. 6, 2017

Related U.S. Application Data

(60) Provisional application No. 62/235,817, filed on Oct. 1, 2015.

(51) Int. Cl.
| | |
|---|---|
| H04N 5/235 | (2006.01) |
| H04N 5/378 | (2011.01) |
| H04N 5/355 | (2011.01) |
| H04N 5/3745 | (2011.01) |

(52) U.S. Cl.
CPC ......... *H04N 5/2355* (2013.01); *H04N 5/3559* (2013.01); *H04N 5/378* (2013.01); *H04N 5/37452* (2013.01)

(58) Field of Classification Search
CPC .......................... H04N 5/2355; H04N 5/3559
See application file for complete search history.

(56) References Cited

U.S. PATENT DOCUMENTS

| | | | |
|---|---|---|---|
| 6,307,195 B1 * | 10/2001 | Guidash ............ | H01L 27/14609 250/208.1 |
| 7,075,049 B2 | 7/2006 | Rhodes et al. | |
| 7,432,540 B2 | 10/2008 | McKee | |
| 7,718,459 B2 | 5/2010 | Patrick et al. | |
| 7,728,896 B2 | 6/2010 | McKee | |
| 8,077,237 B2 | 12/2011 | Li | |
| 9,729,808 B2 * | 8/2017 | Fenigstein ........... | H04N 5/3742 |
| 2004/0251394 A1 * | 12/2004 | Rhodes ............ | H01L 27/14603 250/208.1 |

(Continued)

*Primary Examiner* — Roberto Velez
*Assistant Examiner* — Cynthia Segura
(74) *Attorney, Agent, or Firm* — Treyz Law Group, P.C.; Joseph F. Guihan; David K. Cole

(57) ABSTRACT

An imaging system may include an image sensor having an array of dual gain pixels. Each pixel may be operated using a two read method such that all signals are read in a high gain configuration in order to improve the speed or to reduce the power consumption of imaging operations. Each pixel may be operated using a two read, two analog-to-digital conversion method in which two sets of calibration data are stored. A high dynamic range (HDR) image signal may be produced for each pixel based on signals read from the pixel and on light conditions. The HDR image may be produced based on a combination of high and low gain signals and one or both of the two sets of calibration data. A system of equations may be used for generating the HDR image. The system of equations may include functions of light intensity.

19 Claims, 11 Drawing Sheets

(56) References Cited

U.S. PATENT DOCUMENTS

| | | | |
|---|---|---|---|
| 2006/0157759 A1* | 7/2006 | Okita | H04N 3/155 257/292 |
| 2007/0003849 A1* | 1/2007 | Shirai | H01L 27/14643 430/57.7 |
| 2008/0036888 A1* | 2/2008 | Sugawa | H04N 3/1568 348/294 |
| 2008/0224186 A1* | 9/2008 | Ellis-Monaghan | H01L 27/14609 257/292 |
| 2009/0141155 A1* | 6/2009 | Ellis-Monaghan | H04N 5/35527 348/308 |
| 2009/0237540 A1 | 9/2009 | Johnson | |
| 2009/0272879 A1* | 11/2009 | Dai | H04N 5/3559 250/208.1 |
| 2010/0238332 A1* | 9/2010 | Watanabe | H04N 5/353 348/300 |
| 2012/0153123 A1* | 6/2012 | Mao | H04N 5/35509 250/208.1 |
| 2013/0181117 A1* | 7/2013 | Shimizu | H01L 27/146 250/208.1 |
| 2014/0078368 A1* | 3/2014 | Komori | H04N 5/3745 348/307 |
| 2014/0151532 A1* | 6/2014 | Ito | H04N 5/37452 250/208.1 |
| 2014/0166856 A1* | 6/2014 | Kato | H03M 1/0607 250/208.1 |
| 2014/0263950 A1* | 9/2014 | Fenigstein | H04N 5/355 250/208.1 |
| 2015/0008307 A1* | 1/2015 | Fowler | H01L 27/14643 250/208.1 |
| 2015/0201140 A1* | 7/2015 | Solhusvik | H04N 5/3559 348/229.1 |
| 2015/0237278 A1* | 8/2015 | Sakakibara | H04N 5/3698 348/301 |
| 2015/0350584 A1* | 12/2015 | Fenigstein | H04N 5/355 250/208.1 |
| 2017/0099446 A1* | 4/2017 | Cremers | H04N 5/3559 |

* cited by examiner

HIGH DYNAMIC RANGE IMAGING PIXELS WITH IMPROVED READOUT

This application claims benefit of and claims priority to provisional patent application No. 62/235,817, filed Oct. 1, 2015, which is hereby incorporated by reference herein in its entirety.

BACKGROUND

This relates generally to image sensors, and more specifically, to methods and circuitry for operating image sensor pixels with dual-gain readout for producing high dynamic range (HDR) images.

In conventional imaging systems, image artifacts may be caused by moving objects, moving or shaking camera, flickering lighting, and objects with changing illumination in an image frame. Such artifacts may include, for example, missing parts of an object, edge color artifacts, and object distortion. Examples of objects with changing illumination include light-emitting diode (LED) traffic signs (which can flicker several hundred times per second) and LED brake lights or headlights of modern cars.

While electronic rolling shutter and global shutter modes produce images with different artifacts, the root cause for such artifacts is common for both modes of operation. Typically, image sensors acquire light asynchronously relative to the scenery being captured. This means that portions of an image frame may not be exposed for part of the frame duration. This is especially true for bright scenery when integration times are much shorter than the frame time used. Zones in an image frame that are not fully exposed to dynamic scenery may result in object distortion, ghosting effects, and color artifacts when the scenery includes moving or fast-changing objects. Similar effects may be observed when the camera is moving or shaking during image capture operations.

Conventional imaging systems also may have images with artifacts associated with low dynamic range. Scenes with bright and dark portions may produce artifacts in conventional image sensors, as portions of the image may be over exposed or under exposed.

Dual gain pixels are commonly used to improve the dynamic range of an image sensor. They can be used either in a fixed high or fixed low gain readout mode or in a dual readout mode where both gain modes are read out. In the dual readout mode, charge is either stored entirely on the photodiode or is allowed to overflow to a floating diffusion node during integration. The combination of dual gain readout with overflow during integration allows for the largest dynamic range increase.

Dual gain pixels traditionally read out captured high-gain and low-gain image data in respective high-gain and low-gain configurations. Switching between the high-gain configuration and the low-gain configuration results in electrical crosstalk. This crosstalk causes an undesirable large electrical offset between signals read in the high-gain configuration and signals read in the low-gain configuration. This electrical offset can cause pixel output signals to have a magnitude that is outside of the operating range of analog readout circuitry in the imaging system.

Dual gain pixels traditionally read out captured image data using a method that requires either four pixel read operations and analog to digital conversions (ADCs) to operate without a frame buffer, or three pixel reads and three ADCs to operate with a frame buffer. In the latter case, the frame buffer is required to provide a reference image for offset correction between signals. Performing additional reads and ADC conversions requires additional power. Such increased power consumption is generally undesirable.

It would therefore be desirable to be able to provide high dynamic range (HDR) image sensors that do not have a large electrical offset between pixel output signals, and that require fewer reads and ADC conversions than traditional image sensors.

DETAILED DESCRIPTION

Embodiments of the present invention relate to image sensors, and more particularly, to image sensors having dual gain pixels with high dynamic range (HDR) output signals. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices.

A digital camera module may include one or more image sensors that gather incoming light to capture an image.

In some situations, imaging systems may form a portion of a larger system such as a surveillance system or a safety system for a vehicle (e.g., an automobile, a bus, or any other vehicle). In a vehicle safety system, images captured by the imaging system may be used by the vehicle safety system to determine environmental conditions surrounding the vehicle. As examples, vehicle safety systems may include systems such as a parking assistance system, an automatic or semi-automatic cruise control system, an auto-braking system, a collision avoidance system, a lane keeping system (sometimes referred to as a lane drift avoidance system), etc.

In at least some instances, an imaging system may form part of a semi-autonomous or autonomous self-driving vehicle. Such imaging systems may capture images and detect nearby vehicles using those images. If a nearby vehicle is detected in an image, the vehicle safety system may sometimes operate a warning light, a warning alarm, or may activate braking, active steering, or other active collision avoidance measures. A vehicle safety system may use continuously captured images from an imaging system having a digital camera module to help avoid collisions with objects (e.g., other automobiles or other environmental objects), to help avoid unintended drifting (e.g., crossing lane markers) or to otherwise assist in the safe operation of a vehicle during any normal operation mode of the vehicle.

Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels).

Image sensor pixels may be dual gain pixels that use additional transistors and storage regions along with dual gain readout methods to improve the dynamic range of the pixel. The dual gain readout methods used may be adjusted to reduce electrical offset between pixel output signals, reduce the number of analog to digital conversions (ADCs) required for readout, and remove the need for a frame buffer.

Figure 1:
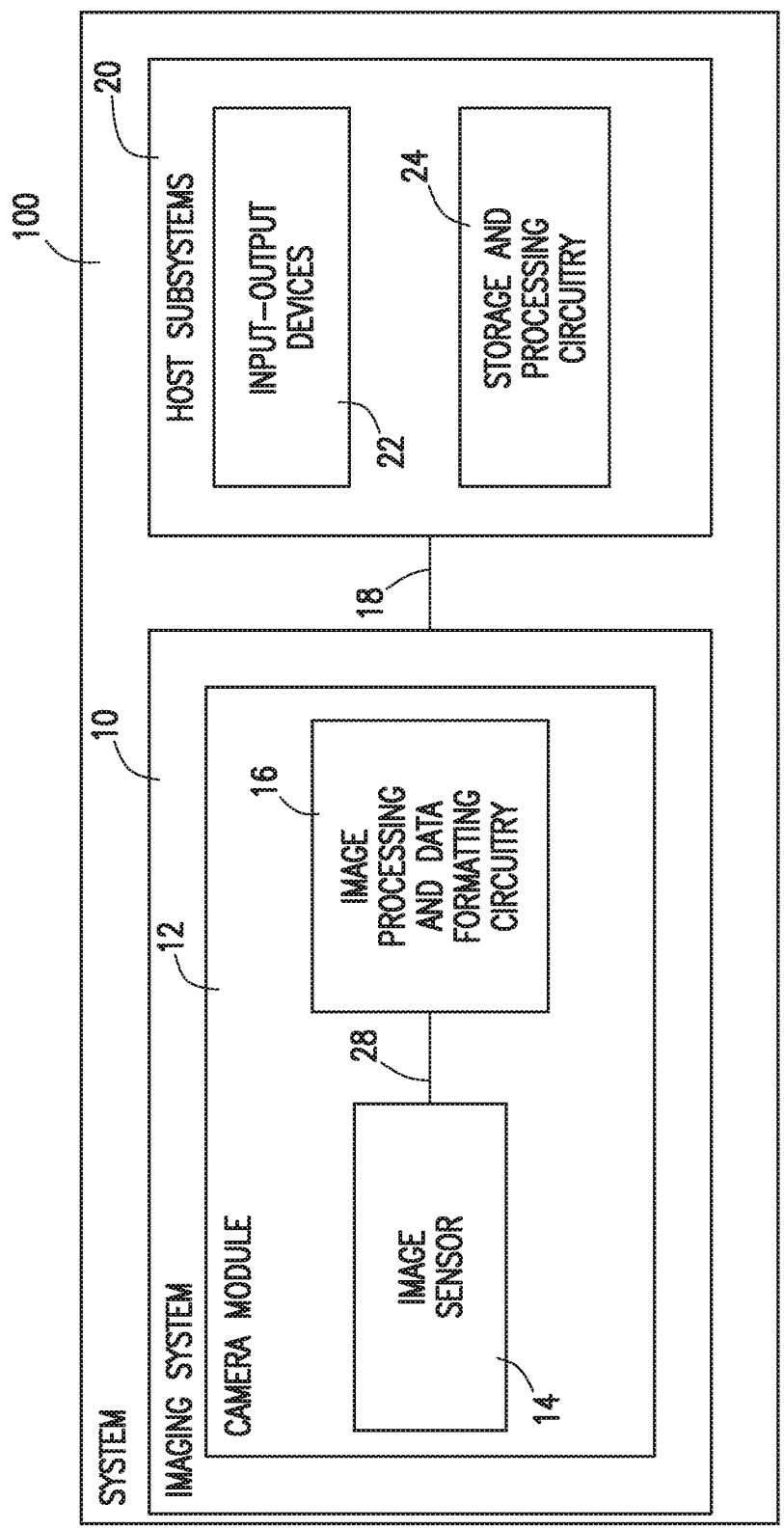
FIG. 1 is a diagram of an illustrative electronic device having an image sensor in accordance with an embodiment.

FIG. 1 is a diagram of an illustrative imaging and response system including an imaging system that uses an image sensor to capture images. System 100 of FIG. 1 may be a vehicle safety system (e.g., an active braking system or other vehicle safety system), may be a surveillance system, or may be an electronic device such as a camera, a cellular telephone, a video camera, or other electronic device that captures digital image data.

As shown in FIG. 1, system 100 may include an imaging system such as imaging system 10 and host subsystems such as host subsystem 20. Imaging system 10 may include camera module 12. Camera module 12 may include one or more image sensors 14 and one or more lenses. The lenses in camera module 12 may, as an example, include M*N individual lenses arranged in an M×N array. Individual image sensors 14 may be arranged in a corresponding M×N image sensor array (as an example). The values of M and N may each be equal to or greater than one, may each be equal to or greater than two, may exceed 10, or may have any other suitable values.

Each image sensor in camera module 12 may be identical or there may be different types of image sensors in a given image sensor array integrated circuit. Each image sensor may be a Video Graphics Array (VGA) sensor with a resolution of 480×640 image sensor pixels (as an example). Other arrangements of image sensor pixels may also be used for the image sensors if desired. For example, images sensors with greater than VGA resolution (e.g., high-definition image sensors), less than VGA resolution and/or image sensor arrays in which the image sensors are not all identical may be used.

During image capture operations, each lens may focus light onto an associated image sensor 14. Image sensor 14 may include photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), address circuitry, etc.

Still and video image data from camera sensor 14 may be provided to image processing and data formatting circuitry 16 via path 28. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip (SOC) arrangement, camera sensor 14 and image processing and data formatting circuitry 16 are implemented on a common semiconductor substrate (e.g., a common silicon image sensor integrated circuit die). If desired, camera sensor 14 and image processing circuitry 16 may be formed on separate semiconductor substrates. For example, camera sensor 14 and image processing circuitry 16 may be formed on separate substrates that have been stacked.

Imaging system 10 (e.g., image processing and data formatting circuitry 16) may convey acquired image data to host subsystem 20 over path 18. Host subsystem 20 may include an active control system that delivers control signals for controlling vehicle functions such as braking or steering to external devices. Host subsystem 20 may include processing software for detecting objects in images, detecting motion of objects between image frames, determining distances to objects in images, filtering or otherwise processing images provided by imaging system 10. Host subsystem 20 may include a warning system configured to disable imaging system 10 and/or generate a warning (e.g., a warning light on an automobile dashboard, an audible warning or other warning) in the event that verification image data associated with an image sensor indicates that the image sensor is not functioning properly.

If desired, system 100 may provide a user with numerous high-level functions. In a computer or advanced cellular telephone, for example, a user may be provided with the ability to run user applications. To implement these functions, host subsystem 20 of system 100 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid-state drives, etc.). Storage and processing circuitry 24 may also include microprocessors, microcontrollers, digital signal processors, application specific integrated circuits, etc.

During operation of imaging system 10, camera module 12 may continuously capture and provide image frames to host subsystem 20. During image capture operations, verification circuitry associated with image sensor 14 may be occasionally operated (e.g., following each image frame capture, following every other image frame capture, following every fifth image frame capture, during a portion of an image frame capture, etc.). Images captured when verification circuitry is operated may include verification image data containing verification information. Verification image data may be provided to image processing circuitry 16 and/or storage and processing circuitry 24. Image processing circuitry 16 may be configured to compare the verification image data to a predetermined data set stored on image processing circuitry 16. Following the comparison, image processing circuitry 16 may send status information or other verification information to host subsystem 20.

Figure 2:
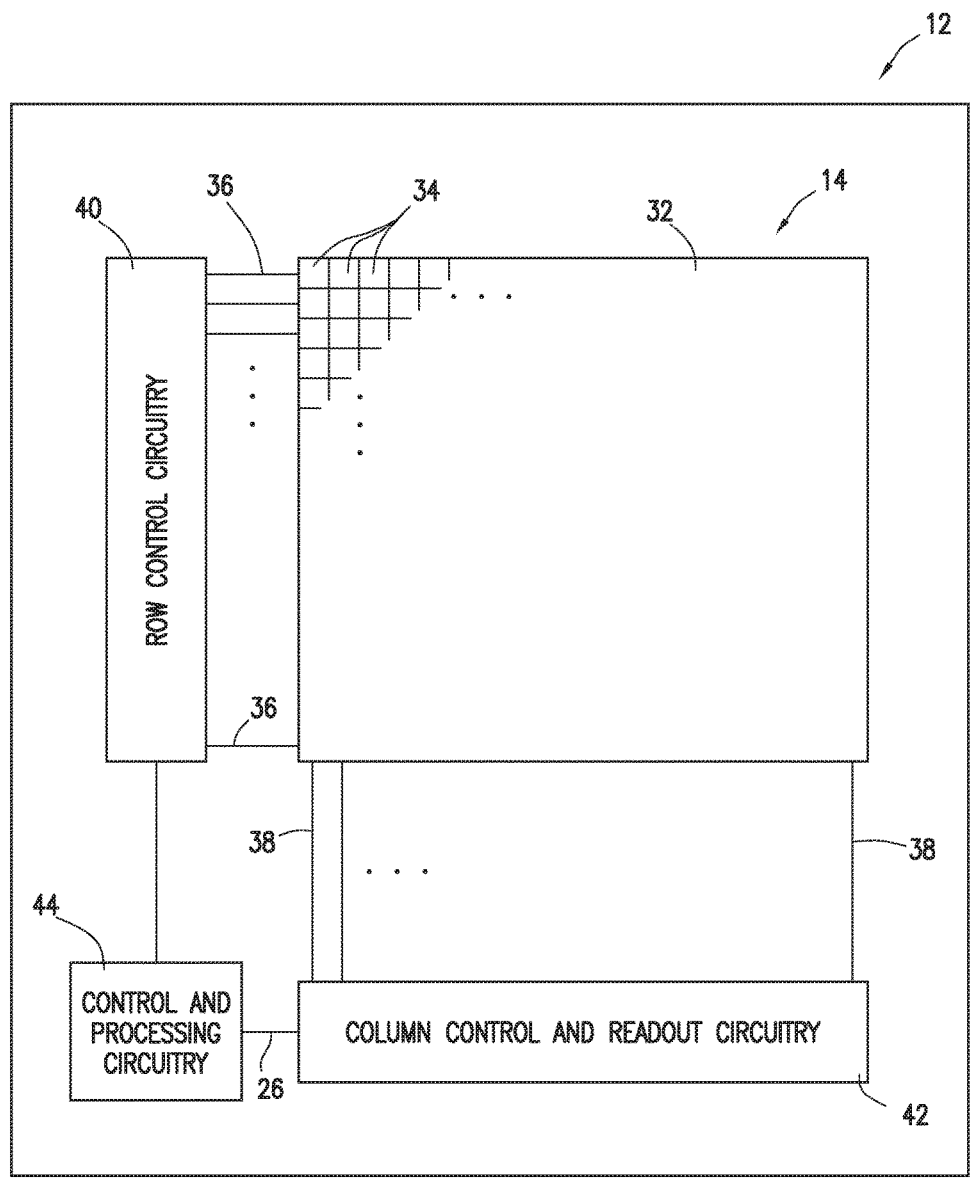
FIG. 2 is a diagram of an illustrative pixel array and associated readout circuitry for reading out image signals in an image sensor in accordance with an embodiment.

An example of an arrangement for camera module 12 of FIG. 1 is shown in FIG. 2. As shown in FIG. 2, camera module 12 includes image sensor 14 and control and processing circuitry 44. Control and processing circuitry 44 may correspond to image processing and data formatting circuitry 16 in FIG. 1. Image sensor 14 may include a pixel array such as array 32 of pixels 34 (sometimes referred to herein as image sensor pixels or image pixels 34). Control and processing circuitry 44 may be coupled to row control circuitry 40 and may be coupled to column control and readout circuitry 42 via data path 26. Row control circuitry 40 may receive row addresses from control and processing circuitry 44 and may supply corresponding row control signals to image pixels 34 over control paths 36 (e.g., dual conversion gain control signals, pixel reset control signals, charge transfer control signals, blooming control signals, row select control signals, or any other desired pixel control signals). Column control and readout circuitry 42 may be coupled to the columns of pixel array 32 via one or more conductive lines such as column lines 38. Column lines 38 may be coupled to each column of image pixels 34 in image pixel array 32 (e.g., each column of pixels may be coupled to a corresponding column line 38). Column lines 38 may be used for reading out image signals from image pixels 34 and for supplying bias signals (e.g., bias currents or bias voltages) to image pixels 34. During image pixel readout operations, a pixel row in image pixel array 32 may be selected using row control circuitry 40 and image data associated with image pixels 34 of that pixel row may be read out by column control and readout circuitry 42 on column lines 38.

Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and column memory for storing the read out signals and any other desired data. Column control and readout circuitry 42 may output digital pixel values to control and processing circuitry 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure (e.g., features described herein as rows may be arranged vertically and features described herein as columns may be arranged horizontally).

If desired, array 32 may be part of a stacked-die arrangement in which pixels 34 of array 32 are split between two or more stacked substrates. In such an arrangement, each of the pixels 34 in the array 32 may be split between the two dies at any desired node within pixel. As an example, a node such as the floating diffusion node may be formed across two dies. Pixel circuitry that includes the photodiode and the circuitry coupled between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any known metal-to-metal bonding technique, such as soldering or welding.

As mentioned above, the desired node in the pixel circuit that is split across the two dies may be a floating diffusion node. Alternatively, the node between a floating diffusion region and the gate of a source follower transistor (i.e., the floating diffusion node may be formed on the first die on which the photodiode is formed, while the coupling structure may connect the floating diffusion node to the source follower transistor on the second die), the node between a floating diffusion region and a source-drain node of a transfer transistor (i.e., the floating diffusion node may be formed on the second die on which the photodiode is not located), the node between a source-drain node of a source-follower transistor and a row select transistor, or any other desired node of the pixel circuit.

Figure 3:
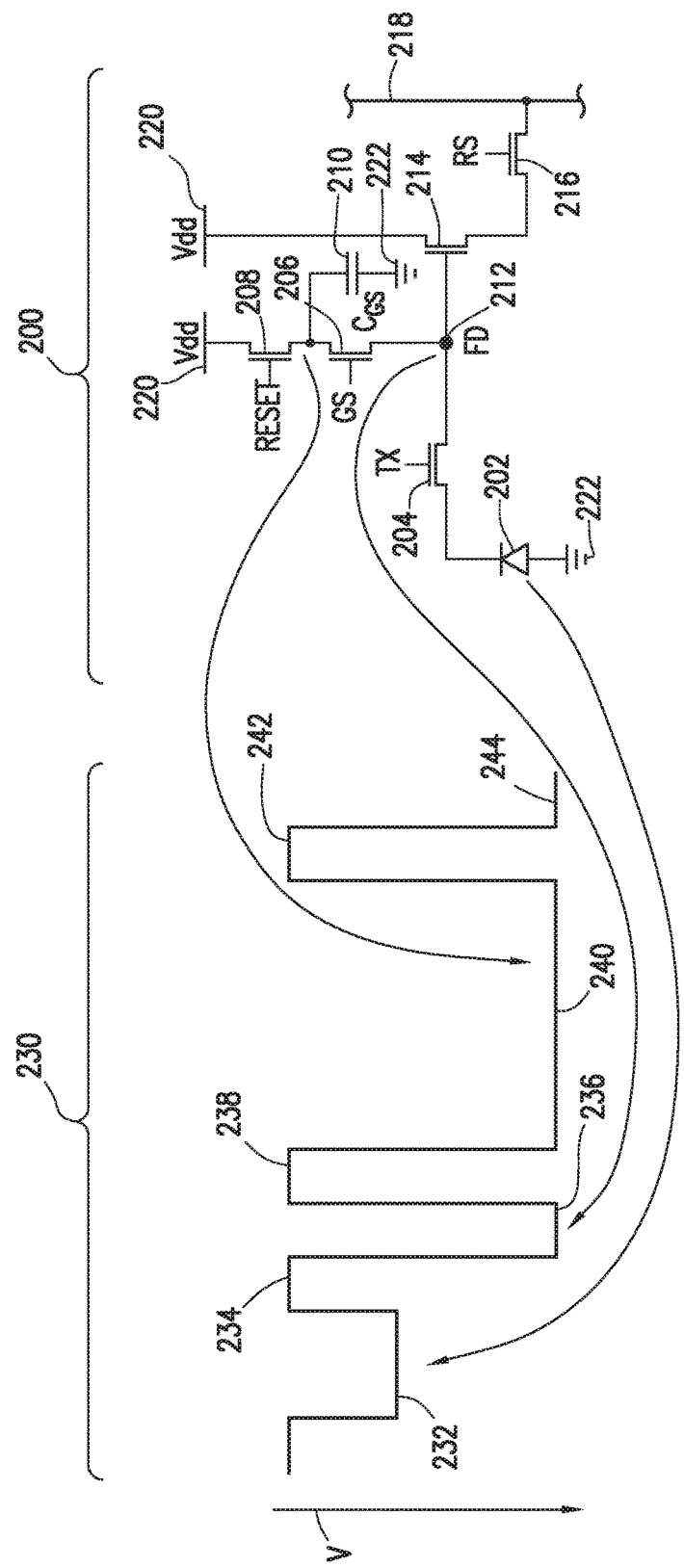
FIG. 3 is a circuit diagram of a dual gain image pixel and a corresponding potential diagram.

FIG. 3 is a circuit diagram of a dual gain image pixel and a corresponding potential diagram. As shown in FIG. 3, dual gain image pixel 200 includes photosensitive element 202 (e.g., photodiode) having a first terminal coupled to ground 222 and a second terminal coupled to floating diffusion node (FD) 212 through transfer transistor 204. Floating diffusion node 212 is coupled to voltage supply 220 through gain select transistor 206 and reset transistor 208. Gain select capacitor 210 has a capacitance $C_{GS}$ and has a first terminal coupled to ground 222 and a second terminal coupled to a node that is interposed between gain select transistor 206 and reset transistor 208. If desired, the first terminal of gain select capacitor 210 may instead be coupled to a fixed potential (not shown). Source-follower transistor 214 has a gate terminal coupled to floating diffusion node 212, a first source-drain terminal coupled to voltage supply 220, and a second source-drain terminal coupled to column output line 218 through row select transistor 216.

A gate terminal of transfer transistor 204 receives control signal TX. A gate terminal of gain select transistor 206 receives control signal GS. A gate terminal of reset transistor 208 receives control signal RESET. A gate terminal of row select transistor 216 receives control signal RS. Voltage supply 220 provides a voltage Vdd. Control signals TX, GS, RESET, and RS are provided by row control circuitry such as row control circuitry 40 in FIG. 2.

Potential diagram 230 shown in FIG. 3 corresponds to the voltage level (V) at different locations within dual gain pixel

Figure 4:
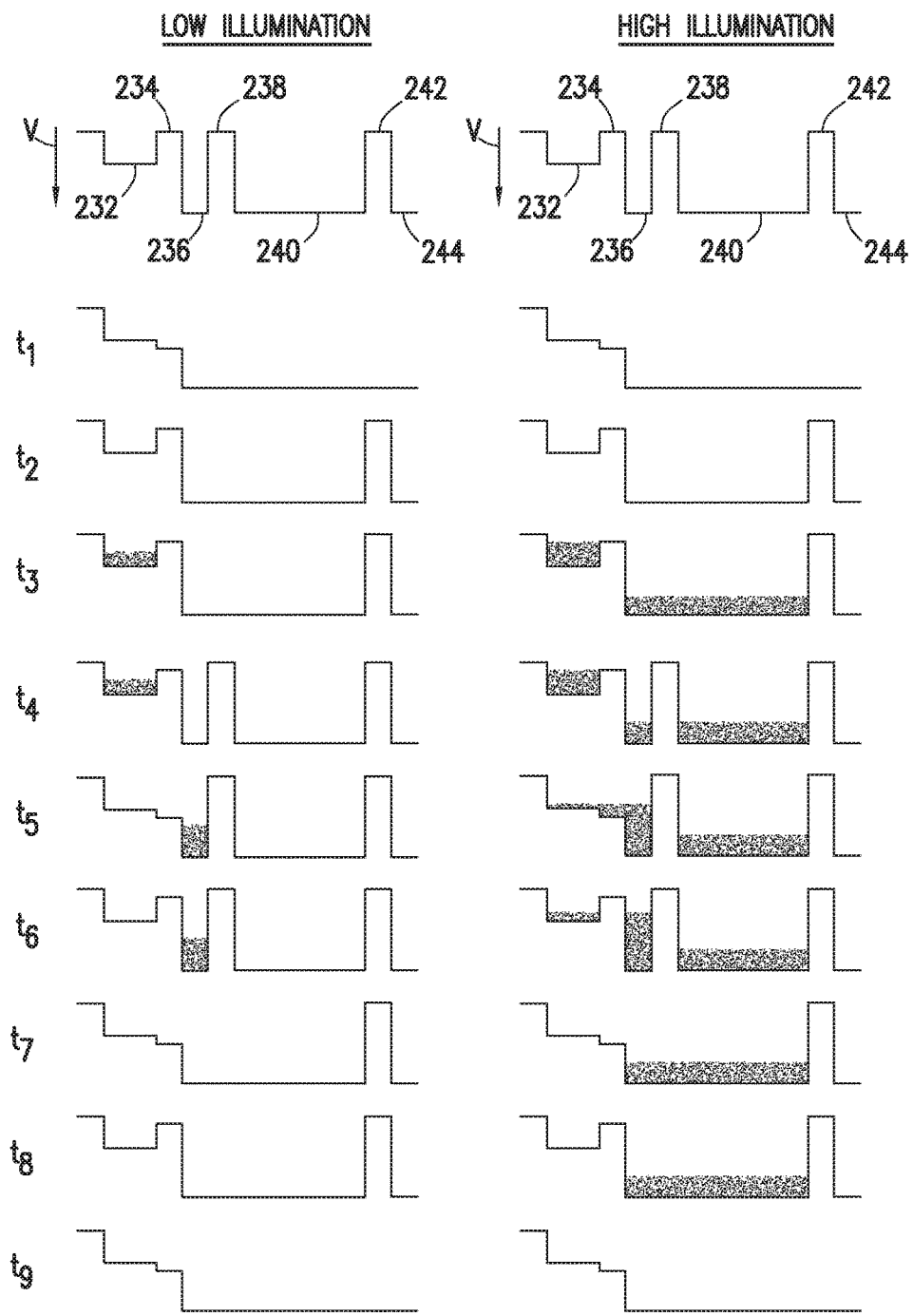
FIG. 4 is a series of potential diagrams illustrating potential levels and the flow of charge through the circuit of FIG. 3 in a three read method of operation in high illumination and low illumination conditions.
Figure 9:
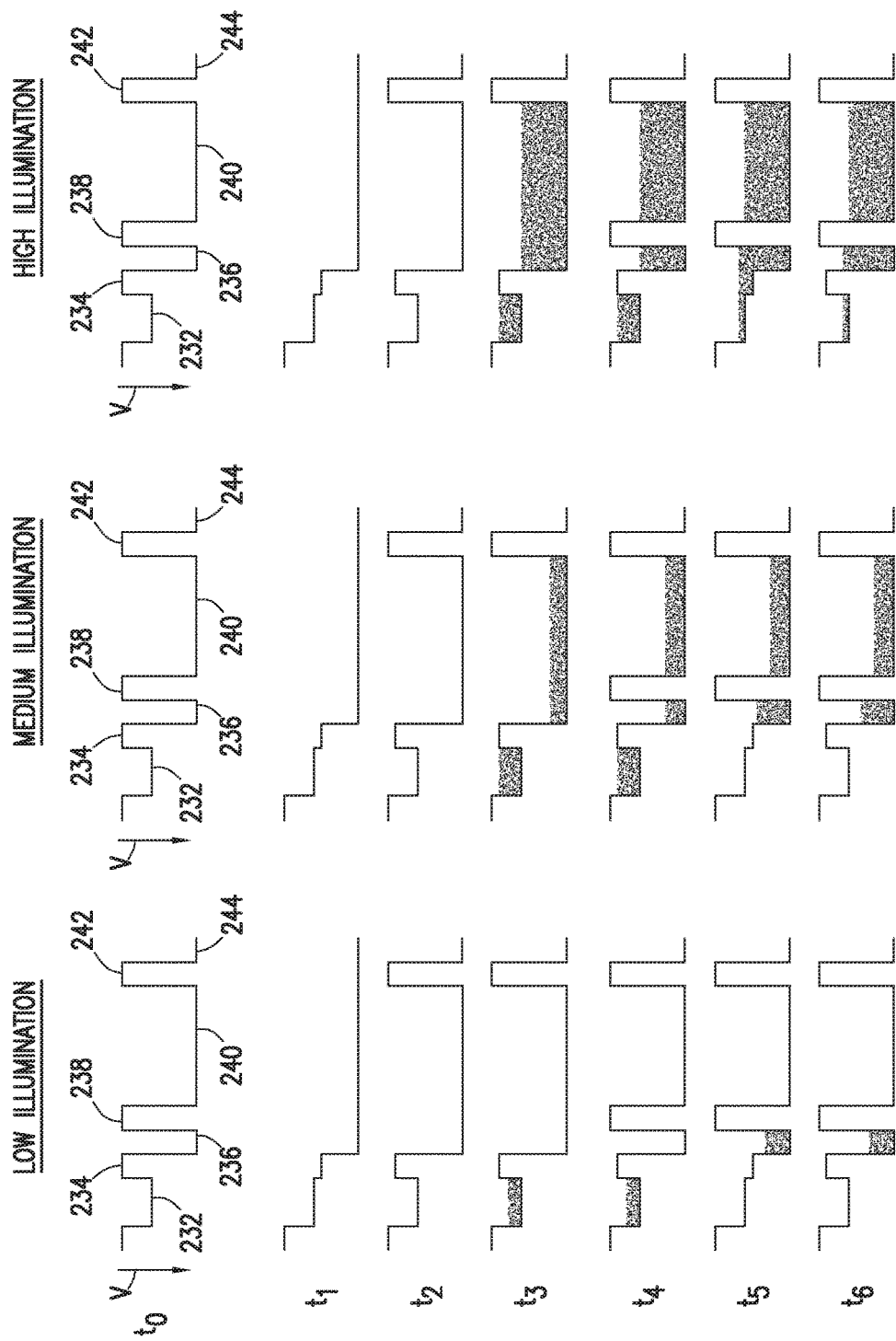
FIG. 9 is a series of potential diagrams illustrating potential levels and the flow of charge through the circuit of FIG. 3 in a two read method of operation in low illumination, medium illumination, and high illumination conditions in accordance with an embodiment.

200 and is used to illustrate voltage and charge levels at these locations during pixel operation in FIGS. 4 and 9. Photodiode region 232 corresponds to the voltage level at photodiode 202. Transfer region 234 corresponds to the voltage level at transfer transistor 204. Floating diffusion region 236 corresponds to the voltage level at floating diffusion node 212. Gain select transistor region 238 corresponds to the voltage level at gain select transistor 206. Gain select storage region 240 corresponds to the voltage level at gain select capacitor 210. Reset region 242 corresponds to the voltage level at reset transistor 208. Voltage supply region 244 corresponds to the voltage level at voltage supply 220. Charge (represented by darkened regions in FIGS. 4 and 9) accumulates in photodiode region 232 during photodiode integration and is transferred to regions 236 and 240 during charge transfer and signal readout operations.

Figure 5:
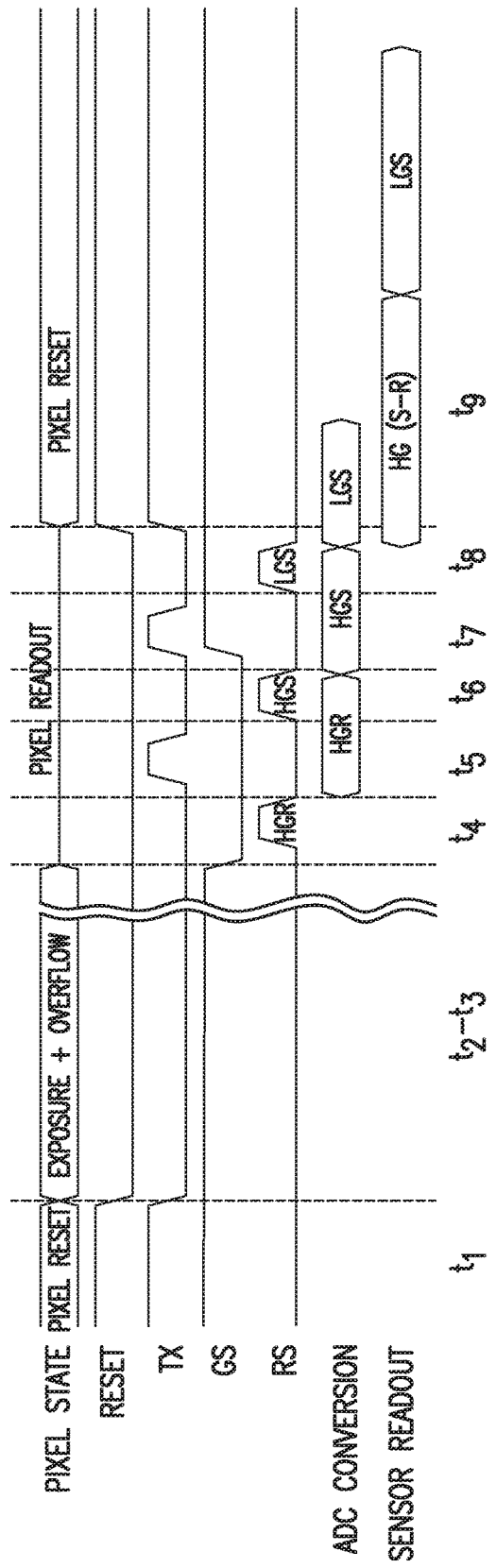
FIG. 5 is a timing diagram illustrating the state of the pixel, the timing of control signals, and the timing of analog-to-digital conversions and sensor readout operations in the circuit of FIG. 3 in the three read method of operation of FIG. 4.

FIG. 4 shows a series of potential diagrams that correspond to potential diagram 230 in FIG. 3 and that illustrate potential levels in dual gain pixel 200 at various time periods during a three read method of operation of dual gain pixel 200 in both low illumination conditions and high illumination conditions. FIG. 5 shows a timing diagram for the three read method of operation of dual gain pixel 200. The timing diagram of FIG. 5 illustrates the state of pixel 200, the timing of control signals RESET, TX, GS, and RS, and the timing of ADCs and sensor readout operations of the image sensor that contains dual gain pixel 200. The timing diagram of FIG. 5 corresponds to the potential diagrams of FIG. 4. At time period $t_1$, signals TX, GS, and RESET are asserted such that regions 234, 238, and 242 are set to a high voltage level in order to reset pixel 200. At time period $t_2$, TX and RESET are asserted such that regions 234 and 242 are set to a low voltage level.

Pixel exposure and overflow occurs at time periods $t_2$-$t_3$. Time period $t_2$ represents the beginning of photodiode charge integration. Time period $t_3$ represents the end of photodiode charge integration. In low illumination conditions, all charge is contained within photodiode region 232 at time period $t_3$, and no overflow occurs. In high illumination, accumulated charge exceeds the capacity of photodiode region 232 and overflows from photodiode region 232 into floating diffusion region 236 and gain select storage region 240 at time period $t_3$.

Pixel readout occurs during time periods $t_4$-$t_8$. At time period $t_4$, control signal RS is pulsed while signals RESET, TX, and GS are deasserted (i.e., while pixel 200 is in a high gain configuration) in order to read the high gain reset voltage HGR. In low illumination conditions in which no charge has overflowed, accumulated charge will remain in photodiode region 232 and will not contribute to HGR. In high illumination conditions, overflow charge in floating diffusion region 236 will contribute to HGR. At time $t_5$, signal TX is asserted while signals GS and RESET are deasserted in order to transfer charge from photodiode region 232 to floating diffusion region 236. In low illumination conditions, charge on the photodiode is completely transferred, while in high illumination conditions, some charge remains in photodiode region 232. At time period $t_6$, signal RS is pulsed while signals RESET, TX, and GS are deasserted in order to read the high gain signal voltage HGS. At time period $t_7$, signals TX and GS are asserted while signal RESET is deasserted such that any charge remaining in photodiode region 232 is distributed between floating diffusion region 236 and gain select region 240. At time period $t_8$, signal RS is pulsed while signal GS is asserted and signals RESET and TX are deasserted (i.e., while pixel 200 is in a low gain configuration) in order to read the low gain signal voltage LGS. Pixel reset occurs again at time period $t_9$. During time period $t_9$, signals RESET, TX, and GS remain asserted until a new pixel exposure and overflow period begins.

As shown in FIG. 5, three ADCs and two sensor readout operations are performed by the image sensor that contains dual gain pixel 200 for each captured image. HGR, HGS, and LGS are each respectively converted from analog to digital signals immediately after being read. Once the HGR and HGS signals have undergone ADC processing, a high gain signal HG(S-R) is generated by subtracting HGR from HGS and is then read out from the image sensor. After the readout of HG(S-R), LGS is read out from the image sensor.

It should be noted that no low gain reset voltage is read during the pixel operation of FIG. 5. Instead, a frame buffer is used to store a calibration voltage CAL that corresponds to the voltage on the floating diffusion node during pixel reset. CAL is subtracted from LGS during downstream processing to generate a low gain signal. The inclusion of this frame buffer requires additional hardware to be included in the image sensor, but reduces the number of reads that need to be performed for each captured image.

Figure 6:
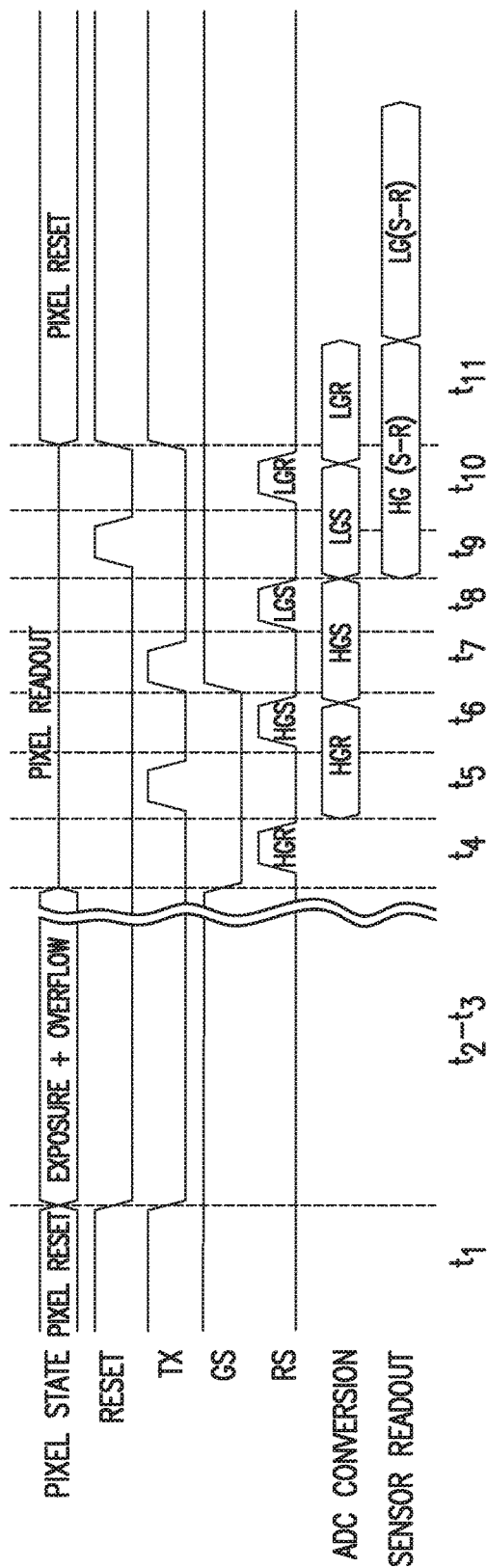
FIG. 6 is a timing diagram illustrating the state of the pixel, the timing of control signals, and the timing of analog-to-digital conversions and sensor readout operations in the circuit of FIG. 3 in a four read method of operation.

FIG. 6 shows a timing diagram for a four read method of operation of dual gain pixel 200. The timing diagram of FIG. 6 illustrates the state of pixel 200, the timing of control signals RESET, TX, GS, and RS, and the timing of ADCs and sensor readout operations of the image sensor that contains dual gain pixel 200. Operations of the four read method that occur during time periods $t_1$-$t_8$ are substantially the same as those described above in connection with FIG. 5 and descriptions of these operations are not repeated here for the sake of brevity. In the four-read method of FIG. 6, pixel readout does not end with the readout of LGS. Instead, at time period $t_9$, signals RESET and GS may be asserted while signals TX and RS are deasserted in order to reset pixel 200 to voltage Vdd. At time period $t_{10}$, signal RS is pulsed while signal GS is asserted and while signals TX and RESET are deasserted in order to read out low gain reset voltage LGR. Pixel reset occurs during time period $t_{11}$. During time period $t_{11}$, signals RESET, TX, and GS remain asserted until a new pixel exposure and overflow period begins.

As shown in FIG. 6, four ADCs and two sensor readout operations are performed by the image sensor that contains dual gain pixel 200 for each captured image. HGR, HGS, LGS, and LGR are each respectively converted from analog to digital signals immediately after being read. Once the HGR and HGS signals have undergone ADC processing, a high gain signal HG(S-R) is generated by subtracting HGR from HGS and is then read out from the image sensor. After the readout of HG(S-R), a low gain signal LG(S-R) is generated by subtracting LGR from LGS and is then read out from the image sensor.

It should be noted that, in the four read method of FIG. 6, low gain signal LG(S-R) is generated based partly on low gain reset voltage LGR that is read at time $t_{10}$, not based on a stored calibration signal (e.g., signal CAL described above in connection with FIG. 5). This eliminates the need for a frame buffer to store a calibration signal. This method increases the number of reads required for each captured image, but does not require any additional hardware for a frame buffer.

Figure 7:
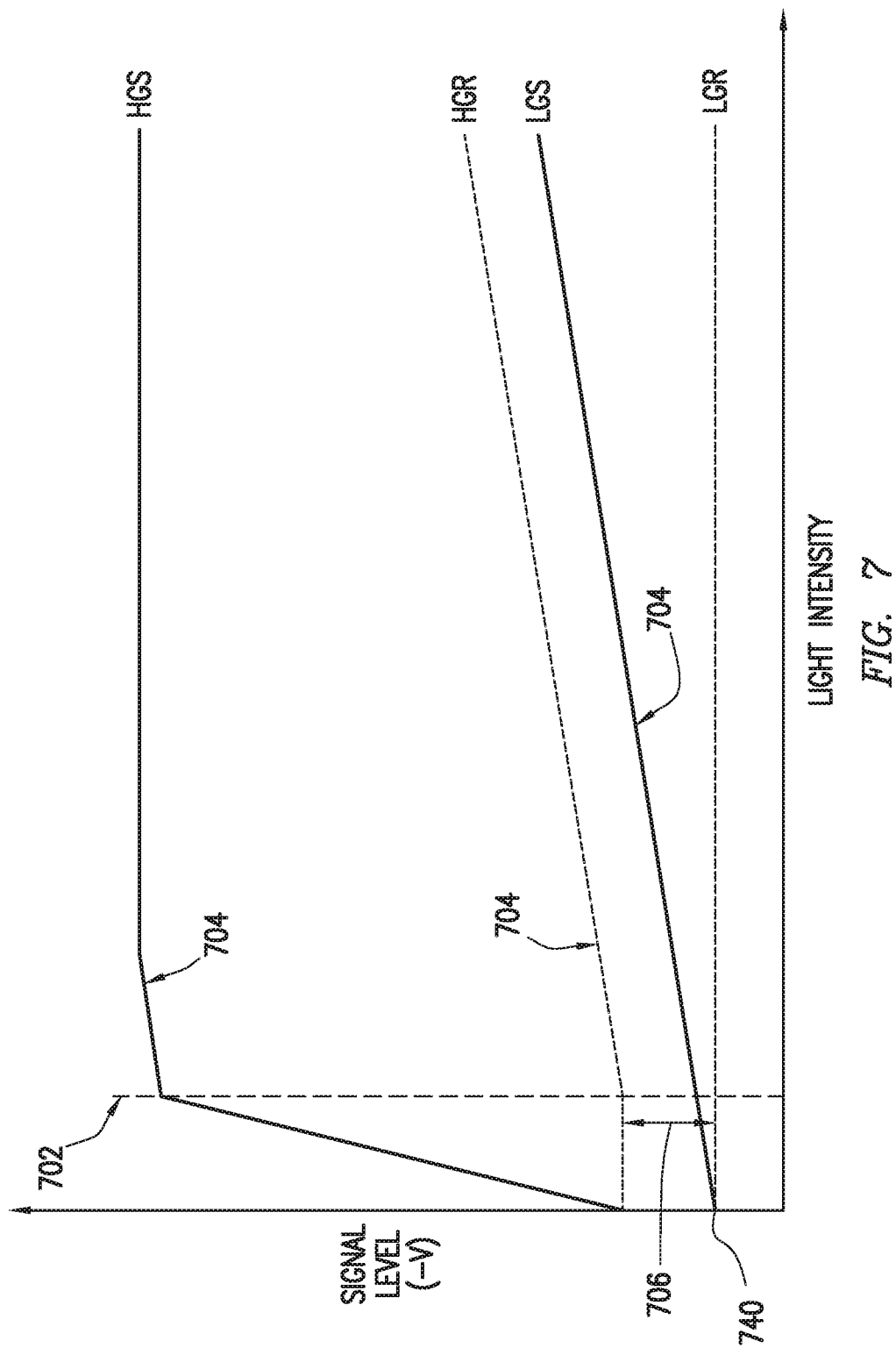
FIG. 7 is a chart illustrating light intensity vs. signal level of pixel output signals corresponding to the three/four read methods of operation of FIGS. 5 and 6.

FIG. 7 is a chart illustrating light intensity vs. signal level (−V) of signals read using the three/four read methods of operation of FIGS. 4-6. Charge overflow occurs at light intensity level 702. In the three read method of operation of FIGS. 4 and 5, a calibration signal CAL corresponding to voltage 740 may be stored in a frame buffer instead of reading signal LGR. Signals HGR and LGS and a portion of signal HGS have the same gradient 704 for light intensities over level 702, however signal HGS becomes clipped once light intensity is large enough in magnitude to create an HGS signal that is outside of the operating range of analog readout chains in the image sensor. Signals HGS and HGR are read in a high gain configuration, whereas signals LGS and LGR are read out in a low gain configuration.

Figure 8:
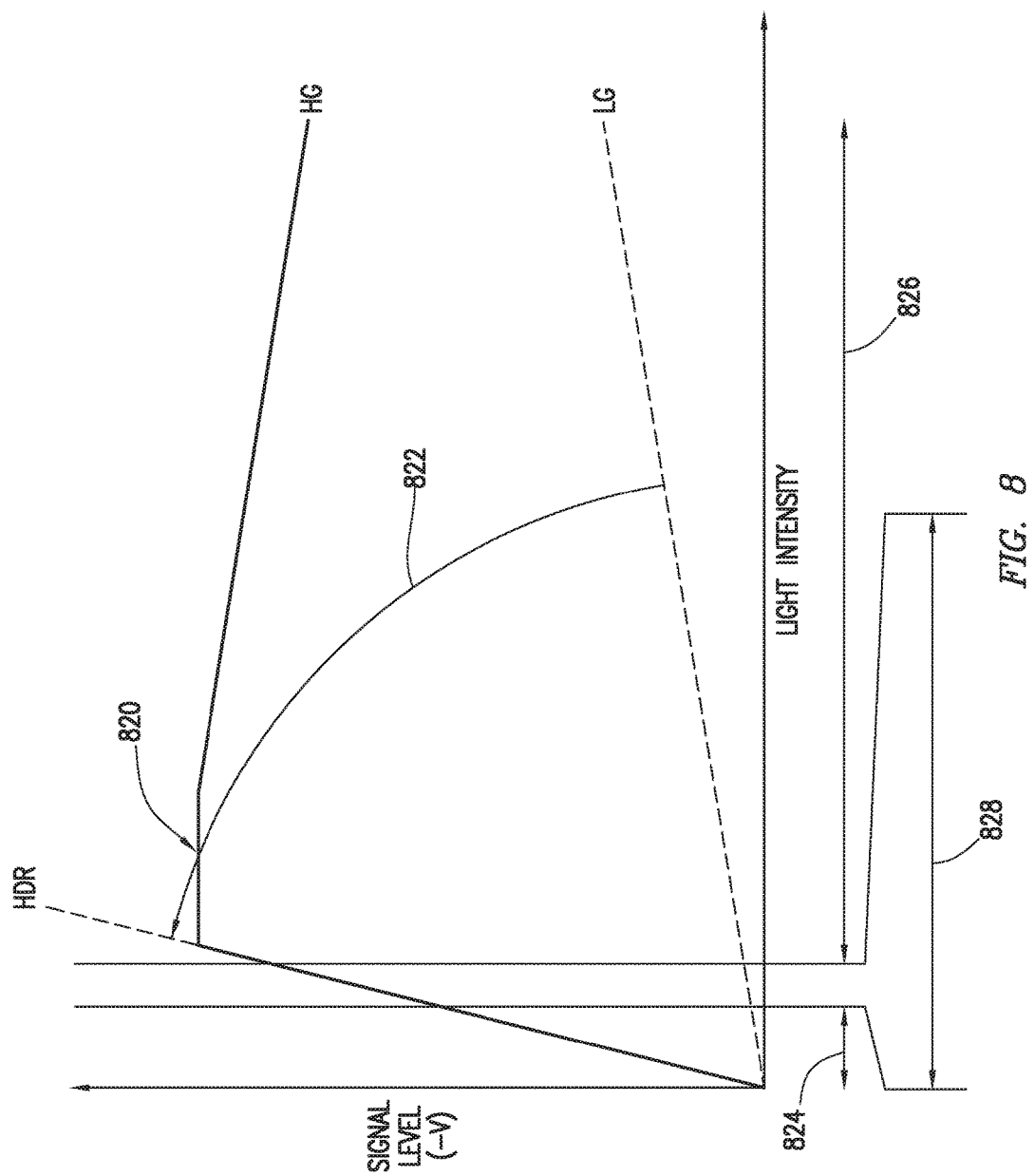
FIG. 8 is a chart illustrating light intensity vs. signal levels of pixel output signals and a method of blending two pixel output signals produce a single linear high dynamic range output signal.

FIG. 8 is a chart illustrating light intensity vs. signal level (−V) of pixel output signals and a method of blending two pixel output signals produce a single linear high dynamic range output signal HDR. High gain signal HG corresponds to high gain signal HG(S-R) of FIGS. 5-7. Low gain signal LG corresponds to low gain signal LG(S-R) or LG(S) of FIGS. 5-7. High dynamic range signal HDR represents the actual signal that is output by the pixel after processing. For light intensities in range 824, high gain signal HG is output as HDR. For light intensities in range 826, low gain signal LG is amplified along path 822 and is then output as HDR. Signal LG is used in range 826 because this is the range at which signal HG experiences clipping 820 due to its signal level being outside of the operational range of the analog readout chains of the image sensor.

In blend region 828, HDR is defined as the sum of a fraction of high gain signal HG and a fraction of the amplified low gain signal LG. For example, HDR may be calculated using equation (1) below, $$HDR = (1-\alpha)(HG) + (\alpha)(G)(LG) \tag{1}$$

where G is the gain ratio between HG and LG that is used to amplify LG, and where a is any desired function (e.g., linear, sigmoid) that ranges from 0 to 1 as light intensity ranges from the start of blend region 828 to the end of blend region 828. Transitioning the value of HDR from HG to LG using blending avoids an abrupt increase in noise and prevents errors in the assumed gain difference between HG and LG. This blending only results in minor signal non-linearity, compared to the discontinuity created when making a hard switch from HG to LG.

Figure 10:
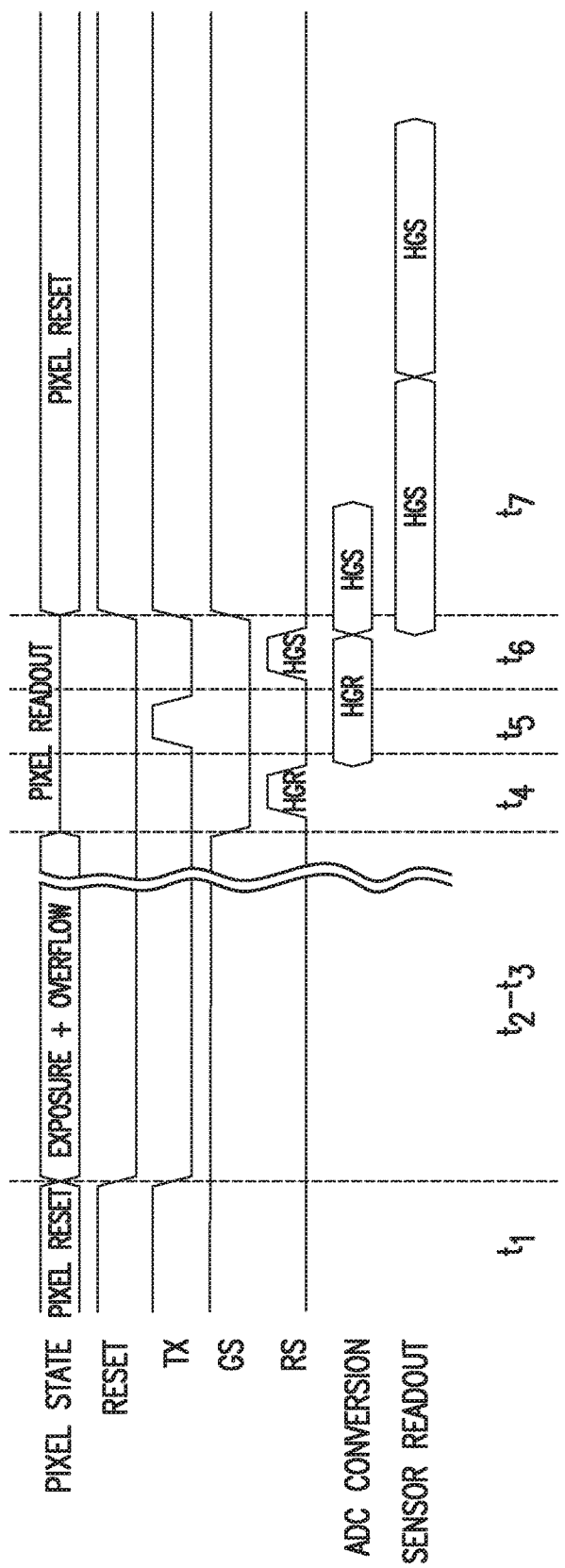
FIG. 10 is a timing diagram illustrating the state of the pixel, the timing of control signals, and the timing of analog-to-digital conversions and sensor readout operations in the circuit of FIG. 3 in a two read method of operation in accordance with an embodiment.

FIG. 9 shows a series of potential diagrams that correspond to potential diagram 230 in FIG. 3 and that illustrate potential levels in dual gain pixel 200 at various time periods during a two read method of operation of dual gain pixel 200 in high illumination, medium illumination, and low illumination conditions. FIG. 10 shows a timing diagram for the two read method of operation of dual gain pixel 200 of FIG. 8. The timing diagram of FIG. 10 illustrates the state of pixel 200, the timing of control signals RESET, TX, GS, and RS, and the timing of ADCs and sensor readout operations of the image sensor that contains dual gain pixel 200. Operation of the two read method of FIGS. 8 and 9 that occur during time periods $t_1$-$t_3$ may be substantially the same as those described above in connection with FIG. 5 and descriptions of these operations are not repeated here for the sake of brevity. In the two read method of FIGS. 9 and 10, all signals may be read out from pixel 200 in high gain configuration. Time periods $t_4$-$t_6$ may correspond to pixel readout. At time period $t_4$, signal RS may be pulsed while signals GS, TX, and RESET are deasserted (i.e., high gain configuration) in order to read high gain reset voltage HGR. In low illumination conditions, floating diffusion region 236 will contain little to no charge when HGR is read. In medium illumination and high illumination conditions, floating diffusion region 236 will contain charge that overflowed from photodiode region 232 during charge accumulation. At time period $t_5$, signal TX may be asserted while signals GS, RS, and RESET are deasserted in order to transfer non-overflow charge from photodiode region 232 to floating diffusion region 236. In low illumination conditions and medium illumination conditions, the non-overflow charge may be fully transferred from photodiode region 232 to floating diffusion region 236. In high illumination conditions, some of the non-overflow charge may remain at photodiode region 232 after the charge transfer takes place at time period $t_5$ due to limited capacity of floating diffusion region 236. At time period $t_6$, signal RS may be asserted while signals GS, TX, and RESET are deasserted in order to read high gain signal voltage HGS. Pixel reset occurs again at time period $t_7$. During time period $t_7$, signals RESET, TX, and GS remain asserted until a new pixel exposure and overflow period begins.

As shown in FIG. 10, two ADCs and two sensor readout operations are performed by the image sensor that contains dual gain pixel 200 for each captured image. HGR and HGS are each respectively converted from analog to digital signals immediately after being read. Once signals HGR and HGS have undergone ADC processing, a high dynamic range image signal HDR (sometimes referred to herein as high dynamic range signal HDR) is generated. HDR may be, for example, generated using image processing circuitry such as image processing and data formatting circuitry 16 in FIG. 1. HDR is calculated based on equation (2) below when light intensity is below a first threshold value. HDR is calculated based on equation (3) below when light intensity is between first and second threshold values. HDR is calculated based on equation (4) below when light intensity is between second and third threshold values. HDR is calculated based on equation (5) below when light intensity is between third and fourth threshold values. HDR is calculated based on equation (6) below when light intensity is above the fourth threshold value.

$$HDR = HGS - HGR \tag{2}$$

$$HDR = HGS - HGR + (\alpha)(G)(HGR - CAL1) \; \alpha = [0 \ldots 1] \tag{3}$$

$$HDR = HGS - HGR + (G)(HGR - CAL1) \tag{4}$$

$$HDR = (1-\beta)((HGS - HGR) + (G)(HGR - CAL1)) + (\beta)(CAL2 + ((G)(HGR - CAL1))) \; \beta = [0 \ldots 1] \tag{5}$$

$$HDR = CAL2 + (G)(HGR - CAL1) \tag{6}$$

where G is the gain ratio between HGR after the start of overflow and HGS before the start of overflow, where overflow is defined as starting at a particular light intensity level, where CAL1 is a stored calibration value corresponding to the value of HGR in darkness (i.e., CAL1 is a dark offset calibration voltage), where CAL2 is a stored calibration value corresponding to the value of (HGS−HGR) when light intensity is between the second and third threshold values (e.g., at the onset of charge overflow from the photodiode), where α is any desired function (e.g., linear, sigmoid) that ranges from 0 to 1 as light intensity ranges from the first threshold value to the second threshold value, and where β is any desired function (e.g., linear, sigmoid) that ranges from 0 to 1 as light intensity ranges from the third threshold value to the fourth threshold value. Functions a and β may be predefined functions of light intensity. Calibration values CAL1 and CAL2 may be, for example, stored in respective frame buffers on the image sensor.

The two read method of FIGS. 9-10 may be advantageous over the methods of FIGS. 4-6. Because the two read method requires fewer reads and fewer ADCs than the three and four read methods, faster operation at the same power level or reduced power consumption at the same operation speed can be achieved. The two read method also slightly increases the maximum photo-charge storage capacity of the pixel in which the method is used. It should be noted that these advantages come with the trade-of of having to store two calibration signals (i.e., external reference images) in the image sensor for use in HDR signal calculation. Additionally, the two read method only performs signal reads in a high gain configuration, which is advantageous over traditional methods that use a combination of high and low gain configuration reads that result in an electrical offset between high and low gain signals.

Figure 11:
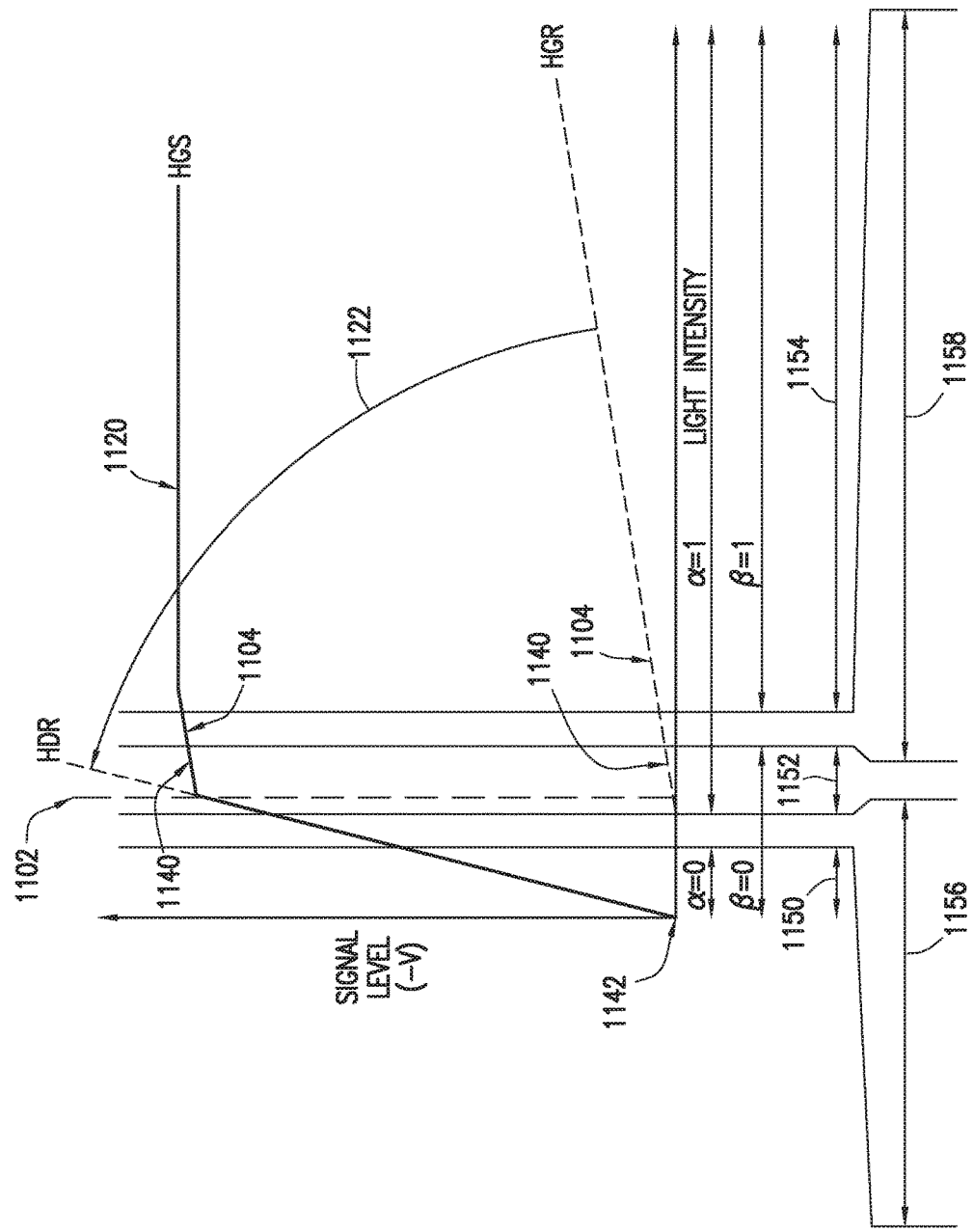
FIG. 11 is a chart illustrating light intensity vs. signal levels of pixel output signals and a method of blending pixel output signals that uses two different blending algorithms to obtain a linear high dynamic range output signal in accordance with an embodiment.

FIG. 11 is a chart illustrating light intensity vs. signal level (−V) of pixel output signals and analog decision making for producing a linear high dynamic range output signal HDR using an improved blending method. Signals HGS and HGR shown in FIG. 11 may correspond to those described in connection with FIGS. 9-10. Saturation point 1102 of HGS may be limited by signal overflow, not by analog readout chain clipping. Analog readout chain clipping will eventually cause additional saturation at region 1120. Overflow begins at the light intensity level associated with saturation point 1102. It should be noted that overflow begins at a lower light intensity than that at which saturation of signal HGS occurs. Between the start of overflow and the start of saturation of signal HGS, signals HGS and HGR may have the same slope 1104. The start of saturation and the start of overflow may be marked by respective light intensity thresholds.

For the two read method of FIGS. 9 and 10, HDR is calculated using equation (2) for light intensities in region 1150. For light intensities in region 1156, HDR is calculated using equation (3) where gain ratio G may correspond to path 1122. For light intensities in region 1152, HDR is calculated using equation (4). For light intensities in region 1158, HDR is calculated using equation (5). For light intensities in region 1154, HDR is calculated using equation (6). Regions 1150, 1152, 1154, 1156, and 1158 may sometimes be referred to herein as ranges of light conditions and ranges of light intensity values.

Point 1142 represents the light intensity and signal level that corresponds to the calibration signal CAL1 that is used in the two read method of FIGS. 9 and 10. Point 1140 represents the light intensity and signal levels that correspond to the HGR and HGS values used to calculate the calibration signal CAL2 that is used in the two read method of FIGS. 9 and 10.

The improved blending method of FIG. 11 may be advantageous over the blending method of FIG. 8. Because signal HGS experiences clipping above a certain light intensity level, HDR calculation becomes less accurate as the clipping light intensity is approached. It is therefore advantageous to include use a second blending method when light intensity falls within region 1158 just before clipping occurs in region 1154. Using the second blending method in this way prevents a discontinuity from occurring when transitioning from using equation (4) in region 1152 to using equation (6) in region 1154. Instead, the second blending method represented by equation (5) allows for a smooth transition between regions 1152 and 1154.

Various embodiments have been described illustrating an imaging system (e.g., system 100 of FIG. 1) including an imaging system and host subsystems. According to one example, an imaging system may include an array of pixels arranged in rows and columns. Each pixel in the array of pixels may include a photodiode that accumulates charge in response to incident light, a floating diffusion node coupled to the photodiode via a transfer transistor, a gain select storage node coupled to the floating diffusion node, and readout circuitry coupled to the floating diffusion node. The readout circuitry may read out a first signal while the pixel is in a high gain configuration. The first signal may be based on a first portion of the accumulated charge that overflows from the photodiode into the floating diffusion node and the gain select storage node The readout circuitry may read out a second signal while the pixel is in the high gain configuration. The second signal may be based on the first portion of the accumulated charge and based on a second portion of the accumulated charge that is transferred to the floating diffusion node through the transfer transistor.

The imaging system may further include image processing circuitry that receives the first and second signals from the readout circuitry and that generates a high dynamic range signal based on the first and second signals. The high dynamic range signal may be generated based on the first and second signals and on first and second calibration signals. The first calibration signal may be a dark offset calibration voltage. The second calibration signal may correspond to a predetermined difference between a high gain signal voltage and a high gain reset voltage sampled at a light intensity level. The light intensity level may correspond to an onset of charge overflow from the photodiode The gain select transistor may be interposed between the floating diffusion node and the gain select storage node. The high gain configuration may occur when the gains elect transistor is deactivated such that the floating diffusion node is isolated from the gains select storage node by the gain select transistor.

According to another example, a method of operating an image system may include accumulating charge in response to incident light with a photodiode in a dual gain pixel, reading out a first signal with readout circuitry while the pixel is in a high gain configuration where the first signal is based on a first portion of the accumulated charge that overflows from the photodiode into a floating diffusion node and a gain select storage node, transferring a second portion of the accumulated charge from the photodiode to the floating diffusion node in the high gain configuration with a transfer transistor, and reading out a second signal with the readout circuitry while the pixel is in the high gain configuration where the second signal is based on the first and second portions of the accumulated charge at the floating diffusion node. The high gain configuration may include deasserting a gate signal for a gain select transistor to isolate the floating diffusion node from the gain select storage region.

The method may further include receiving first and second signals from the readout circuitry and generating a high dynamic range signal based on the first and second signals with image processing circuitry. The high dynamic range signal may be generated based on the first and second signals and on the first and second calibration signals. The first calibration signal may be a dark offset calibration signal. The second calibration signal may be based on a predetermined difference between a high gain signal voltage and a high gain reset voltage each sampled at a light intensity threshold. The light intensity threshold corresponds to a light intensity level at which charge overflow begins to occur at the photodiode.

The method may further include resetting the pixel to a pixel reset voltage after reading out the second signal.

According to another example, a method of operating an imaging system may include accumulating charge in response to incident light with a photodiode in a pixel during an exposure period. A first portion of the accumulated charge may overflow from the photodiode into a storage node during the exposure period and a second portion of the accumulated charge may remain at the photodiode during the exposure period in high light conditions. The method may further include reading out a first signal with readout circuitry while the pixel is in a high gain configuration where the first signal may be based on the first portion of the accumulated charge, reading out a second signal with the readout circuitry while the pixel is in the high gain configuration where the second signal may be based on the first and second portions of the accumulated charge, and generating a high dynamic range image signal with image processing circuitry. The high dynamic range image signal may be generated based on the first and second signals and a first calibration signal in a first range of light conditions. The high dynamic range image signal may be generated based on the first and second signals, the first calibration signal, and a second calibration value in a second range of light conditions.

The first range of light conditions may include low light conditions for which no portion of the accumulated charge overflows from the photodiode. The second signal may become clipped above a light intensity threshold. The second range of light conditions may include a range of light intensity values that is adjacent to and greater than the light intensity threshold. The first calibration signal may be a dark offset calibration signal. The second calibration signal may be based on a predetermined difference between a high gain signal voltage and a high gain reset voltage, each sampled at the light intensity threshold. The high dynamic range image signal may be additionally based on a predefined function. The predefined function may be a function of light intensity.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
an array of pixels arranged in rows and columns, each pixel in the array of pixels comprising:
a photodiode that accumulates charge in response to incident light;
a floating diffusion node coupled to the photodiode via a transfer transistor;
a gain select storage node coupled to the floating diffusion node; and
readout circuitry coupled to the floating diffusion node, wherein the readout circuitry reads out a first signal while the pixel is in a high gain configuration, wherein the first signal is based on a first portion of the accumulated charge that overflows from the photodiode into the floating diffusion node and the gain select storage node, wherein the readout circuitry reads out a second signal while the pixel is in the high gain configuration, wherein the second signal is based on the first portion of the accumulated charge and based on a second portion of the accumulated charge that is transferred to the floating diffusion node through the transfer transistor, and the pixel is reset in response to the readout circuitry reading out the second signal.

2. The imaging system defined in claim 1, further comprising:
image processing circuitry that receives the first and second signals from the readout circuitry and that generates a high dynamic range signal based on the first and second signals.

3. The imaging system defined in claim 2, wherein the high dynamic range signal is generated based on the first and second signals and on first and second calibration signals.

4. The imaging system defined in claim 3, wherein the first calibration signal is dark offset calibration voltage.

5. The imaging system defined in claim 4, wherein the second calibration signal corresponds to a predetermined difference between a high gain signal voltage and a high gain reset voltage sampled at a light intensity level, and wherein the light intensity level corresponds to an onset of charge overflow from the photodiode.

6. The imaging system defined in claim 1, wherein a gain select transistor is interposed between the floating diffusion node and the gain select storage node.

7. The imaging system defined in claim 6, wherein the high gain configuration occurs when the gain select transistor is deactivated such that the floating diffusion node is isolated from the gain select storage node by the gain select transistor.

8. A method of operating an imaging system, comprising:
with a photodiode in a dual gain pixel, accumulating charge in response to incident light;
with readout circuitry, reading out a first signal while the pixel is in a high gain configuration, wherein the first signal is based on a first portion of the accumulated charge that overflows from the photodiode into a floating diffusion node and a gain select storage node;
with a transfer transistor, transferring a second portion of the accumulated charge from the photodiode to the floating diffusion node in the high gain configuration; and
with the readout circuitry, reading out a second signal while the pixel is in the high gain configuration, wherein the second signal is based on the first and second portions of the accumulated charge at the floating diffusion node; and
in response to reading out the second signal, resetting the dual gain pixel to a pixel reset voltage.

9. The method defined in claim 8, wherein the high gain configuration comprises deasserting a gate signal for a gain select transistor to isolate the floating diffusion node from the gain select storage region.

10. The method defined in claim 8, further comprising:
with image processing circuitry, receiving first and second signals from the readout circuitry and generating a high dynamic range signal based on the first and second signals.

11. The method defined in claim 10, wherein the high dynamic range signal is generated based on the first and second signals and on first and second calibration signals.

12. The method defined in claim 11, wherein the first calibration signal is a dark offset calibration signal.

13. The method defined in claim 12, wherein the second calibration signal is based on a predetermined difference between a high gain signal voltage and a high gain reset voltage each sampled at a light intensity threshold, wherein the light intensity threshold corresponds to a light intensity level at which charge overflow begins to occur at the photodiode.

14. A method of operating an imaging system, comprising:
with a photodiode in a pixel during an exposure period, accumulating charge in response to incident light, wherein a first portion of the accumulated charge overflows from the photodiode into a storage node during the exposure period in high light conditions, and wherein a second portion of the accumulated charge remains at the photodiode during the exposure period;

with readout circuitry, reading out a first signal while the pixel is in a high gain configuration, wherein the first signal is based on the first portion of the accumulated charge;

with the readout circuitry, reading out a second signal while the pixel is in the high gain configuration, wherein the second signal is based on the first and second portions of the accumulated charge;

in response to reading out the second signal, resetting the pixel to a pixel reset voltage; and with image processing circuitry, generating a high dynamic range image signal, wherein the high dynamic range image signal is generated based on the first and second signals and a first calibration signal in a first range of light conditions, and wherein the high dynamic range image signal is generated based on the first and second signals, the first calibration signal, and a second calibration value in a second range of light conditions.

15. The method of claim 14, wherein the first range of light conditions comprises low light conditions for which no portion of the accumulated charge overflows from the photodiode.

16. The method of claim 15, wherein the second signal becomes clipped above a light intensity threshold, and wherein the second range of light conditions comprises a range of light intensity values that is adjacent to and greater than the light intensity threshold.

17. The method of claim 16, wherein the first calibration signal is a dark offset calibration signal.

18. The method of claim 17, wherein the second calibration signal is based on a predetermined difference between a high gain signal voltage and a high gain reset voltage each sampled at the light intensity threshold.

19. The method of claim 14, wherein the high dynamic range image signal is additionally based on a predefined function, wherein the predefined function is a function of light intensity.

* * * * *